Apr. 3, 1923.
P. GILINSON
1,450,362
ELECTRIC COIL
Filed Feb. 10, 1919
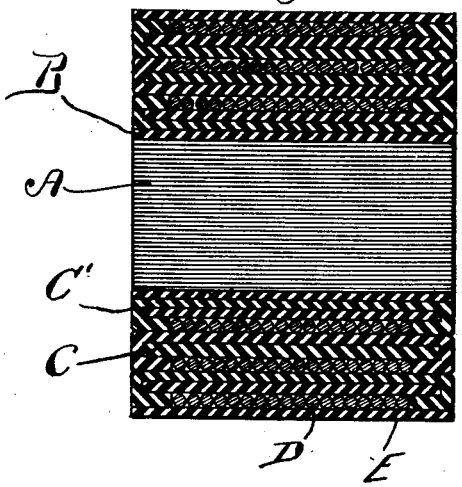
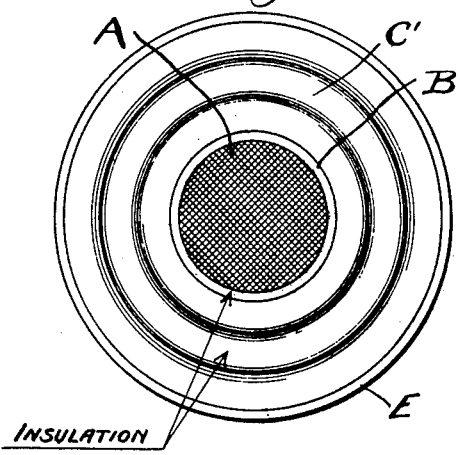
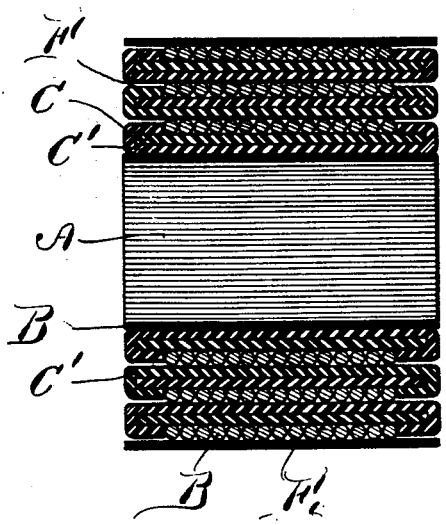
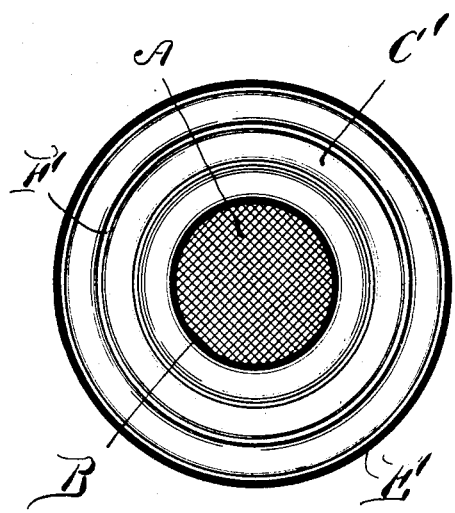
Inventor
Philip Gilinson
by Roberts Roberts & Cushman
his Attys.

Patented Apr. 3, 1923.

1,450,362

UNITED STATES PATENT OFFICE.

PHILIP GILINSON, OF LOWELL, MASSACHUSETTS, ASSIGNOR TO BUTLER AMES, OF LOWELL, MASSACHUSETTS.

ELECTRIC COIL.

Application filed February 10, 1919. Serial No. 276,007.

*To all whom it may concern:*

Be it known that I, PHILIP GILINSON, a citizen of the United States, and resident of Lowell, in the county of Middlesex and State of Massachusetts, have invented new and useful Improvements in Electric Coils, of which the following is a specification.

The present invention relates to electric coils and more particularly to means for supporting and insulating the various layers of windings of electric coils.

Heretofore in winding electric coils it has been customary to build up the successive layers of windings by first placing a layer of insulation around the core, then winding a layer of wire over the layer of insulation, then placing another layer of the insulation around the first layer of winding, then winding a second layer of wire on the second layer of insulation, and so on, until the desired number of layers of windings have been built up, either paper, cloth, fiber or other suitable insulating material being employed to form the layers of insulation. A coil formed in this way is difficult to wind for the reason that there is no provision in the coil itself to indicate where the last layer of wire terminates at each end of the core, after the winding has been covered over with the layer of insulation, and after one or more layers of winding have been applied to the core there is a pronounced tendency for the wire of subsequent layers to slide off at the ends of the coil, especially when the insulation materials are not self supporting as in the case of paper or fabric. Moreover a coil formed in the aforesaid manner has several inherent defects even when the aforesaid difficulties in winding the coil are successfully overcome. For example, at the ends of the coil spaces are left between the succeeding layers of insulation equal in thickness to the diameter of the wire. There is a great danger of sparks jumping through the spaces between adjacent layers of windings or between the windings and the core or other adjacent metallic parts. It is customary to attempt to fill these spaces with varnish or the like, but owing to the thickness of the spaces it is very difficult to close the spaces in this manner. Moreover, when attempting to fill the spaces with varnish the varnish finds its way into the windings and it is very difficult to bake out the moisture thus finding its way into the windings and the varnish injures the windings.

It is the object of the present invention to overcome the aforesaid difficulties and to provide an electric coil which is much easier to wind, which has the aforesaid spaces between successive layers of insulation substantially closed, which is much more effectively insulated than are ordinary coils, and which is generally superior as will hereinafter appear.

The invention comprises layers of insulation having ends of increased thickness, the ends being of sufficient thickness substantially to close the aforesaid spaces between the layers of insulation at the ends of the coil. This increased thickness is preferably produced by upturning the ends of the layers of insulation before the layers are applied to the coil, and the preferred way of upturning the ends of the layers of insulation is to fold the ends back into parallelism with the layers of insulation respectively. The layers of insulation may be made cylindrical, either circular or with flattened sides, in which case they are slipped on over the ends of the coil. However, the layers of insulation are preferably made of strips or ribbons, in which case a strip of sufficient length to encircle the coil and preferably overlap somewhat is wound upon the coil after each layer of winding has been applied. When making the insulation in the form of strips or ribbons, the edges of the ribbon are folded over before the ribbon is wound on the coil and preferably at the time the ribbon is manufactured. When the ribbon is impregnated with varnish or the like the varnish causes the folded edges to adhere to the main portion of the ribbon.

In the preferred form of the invention the insulation between the winding of the coil is made up of two parts or strips, one part being narrower than the other. The narrow strip is placed on the wider, the ends of the latter being folded over and upon the former. The strips of insulation may be of the same thickness or of different thicknesses. Such a construction makes a long wearing coil in which the windings are not easily displaced and the danger of sparking between the windings is eliminated.

In the accompanying drawings which illustrate certain preferred embodiments of my invention, Figure 1 is a central longitudinal section of a coil constructed according to the present invention;

Figure 2 is an end elevation of the coil;

Figure 3 is a central longitudinal section through a modified coil; and

Figure 4 is an end elevation of the modified coil.

The coil shown in Fig. 1 comprises a central core A of iron wires or other suitable core material, a layer of insulation B surrounding the core A, a plurality of alternate layers of insulation C' and windings D and an outer layer of insulation E. In accordance with the present invention the ends of the layers of insulation C' are folded outwardly into parallel contact with the layers respectively, and enclose by the folded ends a narrower strip C of thin insulating material. By making the layers of insulation of substantially the same thickness as the layers of winding the folded ends of the insulation layers substantially close the spaces between the successive layers of insulation. The insulation is formed by laying the thin insulating material upon the wider and thicker insulating material and then folding the ends of the latter over the former. The ends are preferably securely held in place by some adhesive substance.

In building up a coil of the kind shown in Figs. 1 and 2 the inner layer of insulation C is first applied to the core, the first layer of windings is then wound around the first layer of insulation, the second layer of insulation is then placed around the first layer of windings, and so on. The folded ends of each layer of insulation serve as guides to restrict the winding to the space between the folded ends in winding the coil and after the coil is completed the folded ends of the layers of insulation support each other and afford a coil which is firm and rigid at the ends as well as throughout the central portion. The folded ends of the insulation material prevent the windings from sliding off at the ends of the coil both during the process of winding and after the coil is completed. The folded ends insulate the spaces between successive layers so as practically to eliminate the danger of sparking between the successive layers of windings and between the windings and the core or other metallic part. After the core is completed it is preferably dipped in varnish, shellac or the like so that the ends of the coil are effectively sealed. If the folded ends of the insulation layers do not entirely fill the spaces between adjacent layers the varnish will close the spaces.

The modified coil shown in Figs. 3 and 4 is similar to that shown in Figs. 1 and 2, except that the strip C is of approximately the same thickness as insulation C'. Both constructions afford a double layer of insulation between each adjacent pair of windings. Figs. 3 and 4 also illustrate a construction wherein the folded ends of the insulation layers do not entirely close the spaces between succeeding layers, although the folded ends are preferably substantially equal in thickness to the windings, as in Figs. 1 and 2, thereby to support the ends of the layers of insulation projecting beyond the ends of the windings to afford a coil which is firm and rigid at the ends as well as throughout the central portion according to the preceding paragraph. In such cases the spaces F are preferably sealed with varnish or the like as above stated.

The insulation C is preferably formed in long ribbons as above described and the insulation C' is preferably formed in like manner, the edges of the wider portion C' of the ribbon being folded over the narrower portion C of the ribbon before the ribbon is applied to the coil.

While I have shown and described a construction in which the layers of insulation are increased in thickness at both edges it may be desirable under certain circumstances to increase the thickness only at one edge and it is to be understood that the claims are intended to cover the invention when employed in this single manner as well as in the double manner shown and described.

I claim:

1. An insulator for use in making electric coils comprising a pair of superposed layers of insulating material, one of the layers being wider than the other and being folded over the other at both sides.

2. An insulator for use in making electric coils comprising a pair of juxtaposed ribbons of insulating material, one of the ribbons being wider than the other and being folded over the other at the side.

3. In an electric coil an insulator comprising a pair of juxtaposed layers of insulating material, one of the layers being wider than the other and being folded over the other at the side, and a conductor wound around said insulator upon the narrow layer and between the folded over ends of the wider layer.

4. In an electric coil an insulator comprising a pair of superposed ribbons of insulating material, one of the ribbons being wider than the other and being folded over the other at both sides, and a conductor wound around said insulator upon the narrow ribbon and between the folded over ends of the wider ribbon.

5. An electric coil built up of alternate layers of insulation and of conductor wire wound thereon, each layer of insulation comprising a pair of superposed ribbons of insulating material, one of the ribbons being wider than the other and being folded over the other at the side.

Signed by me at Boston, Massachusetts, this 15th day of January 1919.

PHILIP GILINSON.